March 29, 1960 K. B. BREDTSCHNEIDER ET AL 2,930,577
ELASTIC SEAL VALVE
Filed Feb. 15, 1956
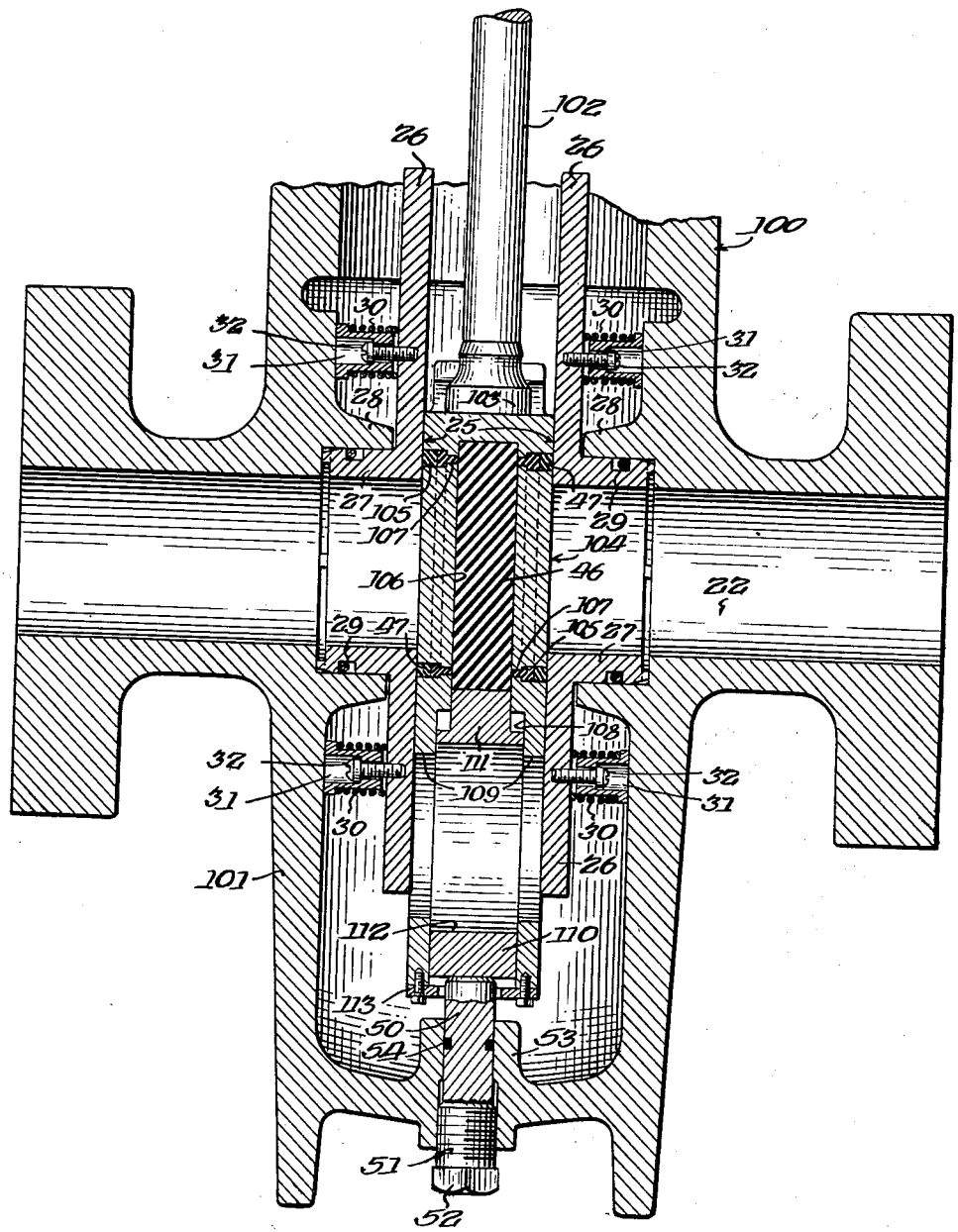
Inventors.
Kurt B. Bredtschneider, &
Hubert C. Laird.
By Joseph O. Lange
Atty.

United States Patent Office 2,930,577
Patented Mar. 29, 1960

2,930,577

ELASTIC SEAL VALVE

Kurt B. Bredtschneider, Chicago, and Hubert C. Laird, Oak Park, Ill., assignors to Crane Co., Chicago, Ill., a corporation of Illinois Application February 15, 1956, Serial No. 565,614

3 Claims. (Cl. 251—200)

The present invention relates to an elastic or resilient seal valve applying sealing pressure only in substantially closed condition, and more particularly to a gate valve of such resilient seal construction.

Valves for controlling flow of fluids often employ yielding and usually resilient material, such as rubber, to provide a seal between the valve closure member or disk and the valve seat. Since the disk must move relative to the seat and any sealing material must fill any gap between these parts in closed position, in many types of valves a shearing action on relatively soft and yielding seal material results, even with very slight clearance between the disk and seat, as the disk moves to or from closed position, which quickly causes ineffective sealing. Efforts have been made to remedy this difficulty by arranging such yielding sealing material so as not to protrude into the clearance space between the parts until pressed by the disk or its operating means in closing movement and to withdraw from the space in initiating opening movement. Such attempts, however, have not solved the problem, because fluid pressure forcing the material into the clearance space is applied well before the closure disk comes to seated position, and is not released in unseating movement until a considerable disk movement has occurred, so that shearing and high frictional forces act on the material. Accordingly, the sealing material is subject to rapid wear and destruction.

By the present invention, a gate disk or similar closure is provided with a recess or space therein opening to the exterior of the disk as through a groove in a seat-engaging face thereof encircling an adjacent flow aperture in closed position, with resilient material in the recess engaged and subjected to pressure by a stud or similar abutment means suitably disposed in the path of closing movement of the disk, either directly or through follower means, so that a portion of the material is forced outwardly as the disk comes to closed position to effect a tight seal with the seat. The sealing material is thus protected against shearing and any considerable friction and, being subjected to appreciable friction only at the very end of closing movement and beginning of opening movement, is relieved of considerable wear. The invention is disclosed herein as incorporated in a gate valve, although it obviously may be employed in other types of valves.

It is an object of the invention to provide a valve with resilient sealing means extending between the valve closure member and valve seat substantially in closed valve condition only.

Another object is the provision of a valve with a sealing arrangement substantially preventing shearing and excessive wear of the sealing material in use.

It is also an object to provide a valve with sealing material disposed within the disk expressed therefrom into engagement with the seat only in substantially closed condition of the valve.

Another object is the provision of a valve sealing arrangement effective at high line pressures which substantially avoids frictional interference with movement of the closure member.

A further object is the provision of a valve sealing arrangement effective at high pressures which does not require frequent replacement of the sealing material.

Another object is the provision of a valve sealing arrangement with sealing material expressable from the closure disk which is not expressed on the downstream side by line pressure on the upstream side.

It is also an object of the invention to provide a valve in which resilient sealing means carried by the disk are held against displacement and protected against wear by retraction therein and are expressed or extruded to seal in closed position.

Another object is the provision of valve disk resilient sealing means adapted to seal at either or both of the upstream and downstream sides, whether in unidirectional or bidirectional valves.

Other and further objects, advantages and features of the invention will be apparent to those skilled in the art from the following description taken with the accompanying drawing, in which the figure is a longitudinal section through a gate valve incorporating the invention.

In the figure, there is shown a rising stem gate valve 100 having a body 101 through which extends a flow passage 22 which is intersected by a chamber within the body providing a pair of spaced opposed flow apertures. Seats 25 are provided at each aperture within the valve body. In this embodiment, the said seats 25 are shown each having a disk guide extension or portion 26 of considerable extent longitudinally of the body chamber and with a transverse tubular portion 27 of internal diameter substantially the same as the body flow passage 22. The said tubular portion is telescopically received in registry with the said passage within an annular body projection or lip 28 extending inwardly of the body wall and defining an enlarged recess at the inner ends of the passage 22. An O-ring 29 seals the contacting surfaces as shown. It will be apparent that the flow aperture may be taken as defined by the tubular portion 27, or the tubular portion may be considered as forming part of the said flow passage. The oppositely disposed seats 25 are urged toward each other by a number of suitably spaced apart coil springs 30 and the adjacent inner wall surface of the body 101. It will be noted that each spring bears at one end against one of the seats and at the other against a flange of a cup-shaped guide member 31 which engages within the spring as shown. A screw 32 or similar fastening means secured to the seat projects through the bottom of the cup-shaped member to hold the latter member and the spring in assembly with the seat and guide 25 and 26 respectively, while allowing relative movement of the parts. By this construction and arrangement, the seats 25 are urged both by the springs 30 and the pressure of the liquid flowing through the valve into close engagement with the gate closure disk 104 disposed therebetween. It will of course be clear that the invention may be employed with other seat constructions and arrangements.

A valve stem 102 extends from the exterior of the body into the chamber between the seats 25, and has T-head connection as at 103 with a gate closure disk 104. The valve stem is arranged in any well-known manner for reciprocal movement to slide the disk between open and closed positions. Adjacent the end connected to the valve stem, the disk 104 has a shut-off portion which extends between the flow apertures in closed position to prevent flow through the valve. An annular groove 105 is formed in each face of the disk shut-off portion to oppose the adjacent seat and extend about the flow aperture in closed disk position. The disk is of hollow formation, having a central cavity or recess 106 within the shut-off portion thereof between the grooves 105 and communicating with the grooves as through a plurality of passages 107. The recess 106 opens into an enlarged hollow portion 108 opening from the end of the disk opposite that connected to the stem 102. The walls of the disk about the hollow portion engaging the seats are provided with apertures 109 opening into the hollow portion 108. The apertures are of substantially the same diameter as the flow apertures and adapted to register with the latter in open disk position. Within the hollow portion 108 is a follower 110 slidable toward and from the recess 106 and having a projection 111 engaged in and substantially filling the opening of the recess to serve as a piston or plunger. The follower has an opening 112 therethrough preferably of somewhat greater diameter than the apertures 109 in the disk walls so as to provide unrestricted communication therebetween in any position of the follower in fully open valve condition.

Resilient material 46, such as rubber, is disposed in the recess 106, grooves 105 and connecting passages 107 in a raw or partly finished but unmolded condition and molded, cured, or set in any manner suitable for the particular material. As an alternative, the disk may be formed of separable cooperating parts and the material 46, pre-molded to the desired shape, inserted therein by assembly. The outer portion of the material in each of the grooves 105 serves as a sealing portion engaging against the adjacent seat 25 upon closing of the valve. This sealing portion may consist of a ring 47 of harder material, such as hard rubber, metal or other suitable substance in order to better resist wear and of any desired construction, which, however, may be considered as a part of the resilient material 46. It will be evident that upon movement of the follower 110 relative to the disk such that the projection 111 moves inwardly of the recess 106, the resilient material is subjected to pressure and the material in the grooves 105 is forced outwardly. The follower 110 is held against movement out of the hollow portion 108 by a retaining plate 113 screwed or otherwise secured across the opening of the hollow portion 108 and apertured for the projection therethrough of an abutment stud 50 which extends through the wall of the body 101 and has a portion 51 threaded for adjusting engagement in the body wall. The outer end 52 of the stud is squared or otherwise formed for engagement by a suitable tool to facilitate its rotation for adjustment inwardly or outwardly by means of the threaded connection. The inner portion of the stud 50 extends through a hollow boss 53 on the interior of the body wall and has a peripheral groove carrying an O-ring 54 for sealing against fluid leakage between the stud and the boss.

When the disk is moved to open position, the flow apertures are placed in communication with each other through the apertures 109 in the disk walls and the aperture 112 of the follower 110 so that the flow passage 22 is completed. When the disk is moved to closed position, the shut-off portion moves between the seats 25 and as the grooves 105 and the sealing portions or rings 47 of the resilient material, still entirely within the grooves 105, come into encircling relation with the flow apertures, the follower 110 is engaged by the stud 50 and held against further movement. As the disk then continues to the fully closed position shown, relative inward movement of the follower occurs so that the projection 111 applies pressure to the resilient material 46 and the sealing rings 47 are pressed outwardly into tight sealing engagement with the seats 25. It will be apparent that no shearing of the material is occasioned by the edges of the flow apertures, and since only slight movement of the disk occurs between the engagement of the follower with the stud 50 and the positioning of the disk in the fully closed position with the desired sealing pressure applied, there is not much frictional wear of the material. In opening movement of the disk, the sealing pressure is quickly released and the sealing portions of the material retracted within the grooves 105. Therefore, there is but little wear on the sealing portions of the material and no shearing can occur.

It will be obvious that the sealing arrangement may be employed at only one face of the disk, and that more than one annular face groove may be formed in either face of the shut-off portion of the disk to provide multiple seals about the adjacent flow aperture in closed position.

It may be pointed out, also, that the follower may have a portion projecting out of the disk, to engage against the wall of the valve body serving as an abutment or suitable abutment means thereon in closing movement of disk, instead of having abutment means to project into the disk to engage the follower. In such case, the projecting portion of the follower may be fixed relative to the portion within the disk engaging the resilient material 46, and engage with adjustable abutment means typified by the stud 50, or may be threadedly or otherwise adjustable relative to the material-engaging portion in the disk and engage with the valve body wall or a fixed abutment thereon, no adjustable abutment means being then required. In any case, however, it is desirable that adjustment be provided for, so that the sealing pressure may be set at a desired value and compensation made for any wear of the sealing material. In adjusting the valve, after retracting the abutment or projecting follower portion, as the case may be, the disk is moved from open position toward closed position until axial projections of the flow apertures would fall just within the inner peripheries of the annular disk face grooves, and the follower and abutment adjusted so as to engage each other. Upon closing movement of the disk from the position at which the follower engages the abutment means, the follower is held against movement and pressure is thus applied to the resilient material to effect the tight sealing as already explained. It is to be noted that the force applied to the disk to move it to closed position does not act directly on the resilient material at any time, so that no extruding pressure is applied thereto except through engagement of the follower with the abutment means.

It will be apparent that while the gate disk has been disclosed as having an apertured portion providing communication between the flow apertures through the disk in its open position, the disk may be formed to provide for communication between the flow apertures past an end of the disk rather than through it, in accordance with known practice in the art, an apertured portion as such being omitted. In such case, the disk is so proportioned as to extend substantially clear of the flow apertures when moved to open position, provision being made for accommodation of the body of resilient material.

Since many apparently widely different embodiments of this invention may be made without departing from the spirit and scope hereof, it is to be understood that this invention is not limited except as defined in the appended claims.

We claim:
1. A gate valve comprising a valve body defining a chamber having flow apertures in opposed sides thereof, a seat about each of said apertures, a closure gate disk movable transversely of the seats for opening and closing the apertures having a shut-off portion engaging between the seats and closing the apertures in closed position of the disk and a chambered portion with openings in opposed walls thereof substantially registering with the apertures in open disk position, an annular groove in each seat-engaging face of said shut-off disk portion opposing the adjacent seat in encircling relation to the adjacent aperture in closed position of the disk, a recess within said shut-off disk portion communicating with said grooves and open to said chambered portion, resilient material in said recess and grooves including an outer sealing portion in each groove adapted for pressure seal engagement with the adjacent seat, means for moving the disk between open and closed positions, follower means in said chambered disk portion engaging the resilient material in the recess movable relative to the disk for distorting the material to force outwardly the material in the grooves for pressing sealingly against the seats and having a passage therethrough connecting said openings of the chambered portion and of greater cross-sectional area than said openings, and abutment means in the body disposed in the path of closing movement of the disk engaging said follower in disk closing movement to effect relative movement of the follower and disk for said outward forcing of the material in the grooves.

2. A gate valve comprising a valve body having means defining therein a pair of spaced generally opposed flow apertures, a seat about each of said apertures, a closure gate disk movable transversely between said seats to open and close the apertures engaging the seats and closing the apertures in closed position, means for moving the disk between open and closed positions, an inwardly extending recess in the disk, an annular groove in each seat-engaging face of the disk opposing the adjacent seat in closed position of the disk and open to said recess, resilient material in the recess and grooves including an outer sealing portion in each groove for pressure seal engagement with the adjacent seat, follower means carried by the disk engaging the resilient material movable to distort the material for pressing outward said sealing portions in the grooves and disposed between the apertures in open disk position, said follower having a passage therethrough allowing flow between the apertures in said open position, and abutment means in the body extending in the path of movement of the disk engaging the follower means in closing disk movement to cause relative movement of the follower means and disk for said distortion of the resilient material and outward pressing of the sealing portions against the seats in closed position of the disk.

3. A gate valve comprising a valve body having means defining spaced generally opposed flow apertures, a seat about each of said apertures, a closure gate disk movable transversely of said seats to open and close the apertures engaging the seats and closing the apertures in closed disk position, recess means in the disk, an annular groove in a seat-engaging face of the disk opposing the adjacent seat in closed disk position and communicating with the recess means, resilient material in the recess means and groove, follower means carried by the disk engaging the material in the recess means movable relative to the disk for distorting the material to press outwardly the portion thereof in the groove and disposed between the apertures in open disk position, said follower means having a passage therethrough allowing flow between the apertures in said open position, and abutment means in the body extending in the path of closing movement of the disk engaging said follower means in closing disk movement to effect relative movement of the follower means and disk for said distortion and outward pressing of the material.

References Cited in the file of this patent
UNITED STATES PATENTS

| | | |
|---|---|---|
| 2,224,446 | Penick | Dec. 10, 1940 |
| 2,229,871 | Penick | Jan. 28, 1941 |
| 2,385,463 | Penick | Sept. 25, 1945 |
| 2,552,991 | McWhorter | May 15, 1951 |
| 2,734,714 | Knox | Feb. 14, 1956 |
| 2,865,597 | Lucas | Dec. 23, 1958 |